United States Patent
Ono et al.

(10) Patent No.: US 12,322,529 B2
(45) Date of Patent: Jun. 3, 2025

(54) WIRING MEMBER AND DEVICE WITH MOVABLE PART PROVIDED WITH SAME

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Masami Ono, Osaka (JP); Hidetoshi Ishida, Osaka (JP); Satoshi Yamamoto, Osaka (JP); Yumiko Kase, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 192 days.

(21) Appl. No.: 18/033,875

(22) PCT Filed: Oct. 20, 2021

(86) PCT No.: PCT/JP2021/038735
§ 371 (c)(1),
(2) Date: Apr. 26, 2023

(87) PCT Pub. No.: WO2022/097475
PCT Pub. Date: May 12, 2022

(65) Prior Publication Data
US 2023/0402205 A1 Dec. 14, 2023

(30) Foreign Application Priority Data
Nov. 5, 2020 (JP) ................................ 2020-185315

(51) Int. Cl.
*B60R 16/027* (2006.01)
*B60N 2/02* (2006.01)
(Continued)

(52) U.S. Cl.
CPC ....... *H01B 7/0823* (2013.01); *B60R 16/0215* (2013.01); *B60R 16/027* (2013.01); *H02G 11/00* (2013.01); *B60N 2/02* (2013.01)

(58) Field of Classification Search
CPC . H01B 7/0823; B60R 16/0215; B60R 16/027; H02G 11/00; B60N 2/02
(Continued)

(56) References Cited

U.S. PATENT DOCUMENTS 9,706,647 B2 * 7/2017 Hsu ..................... H01L 23/5386
2007/0054511 A1  3/2007 Ittel
(Continued)

FOREIGN PATENT DOCUMENTS

JP  2005-347247  12/2005
JP  2009-252563  10/2009
(Continued)

OTHER PUBLICATIONS

International Search Report issued in International Patent Application No. PCT/JP2021/038735, dated Nov. 22, 2021.
(Continued)

*Primary Examiner* — Timothy J Thompson
*Assistant Examiner* — Michael F McAllister
(74) *Attorney, Agent, or Firm* — GREENBLUM & BERNSTEIN, P.L.C.

(57) ABSTRACT

A wiring member includes at least one wire-like transmission member having a zigzag section extending in a zigzag form, and a flexible base material having an arrangement surface. The zigzag section is disposed on the arrangement surface. The base material keeps the zigzag section in a zigzag form.

10 Claims, 11 Drawing Sheets

(51) Int. Cl.
  *B60R 16/02* (2006.01)
  *H01B 7/08* (2006.01)
  *H02G 11/00* (2006.01)
(58) Field of Classification Search
  USPC ................................................ 174/72 A
  See application file for complete search history.

(56) References Cited

U.S. PATENT DOCUMENTS

| | | | |
|---|---|---|---|
| 2007/0299471 A1* | 12/2007 | Takahashi | A61B 5/282 607/2 |
| 2010/0263926 A1 | 10/2010 | Murayama et al. | |
| 2015/0065840 A1* | 3/2015 | Bailey | H05K 1/0283 174/251 |
| 2018/0033520 A1* | 2/2018 | Yoshida | H01B 7/06 |
| 2021/0202129 A1 | 7/2021 | Nishimura et al. | |
| 2021/0276500 A1 | 9/2021 | Nishimura et al. | |

FOREIGN PATENT DOCUMENTS

| | | |
|---|---|---|
| JP | 2010-27417 | 2/2010 |
| JP | 2019-75491 | 5/2019 |
| WO | 2009/096324 | 8/2009 |
| WO | 2016/133065 | 8/2016 |
| WO | 2019/225096 | 11/2019 |
| WO | 2020/003553 | 1/2020 |

OTHER PUBLICATIONS

International Preliminary Report on Patentability issued in International Patent Application No. PCT/JP2021/038735, dated Nov. 28, 2022.

Japan, Notice of Reasons for Refusal issued in JP Application No. 2020-185315, dated May 28, 2024.

* cited by examiner

WIRING MEMBER AND DEVICE WITH MOVABLE PART PROVIDED WITH SAME

TECHNICAL FIELD

The present disclosure relates to a wiring member and a device with a movable part including the wiring member.

BACKGROUND ART

Patent Document 1 discloses a wire harness having flexibility and capable of being provided with a branch circuit.

PRIOR ART DOCUMENTS

Patent Document(s)

Patent Document 1: Japanese Patent Application Laid-Open No. 2010-27417

SUMMARY

Problem to be Solved by the Invention

In Patent Document 1, electrical wires are braided to provide flexibility to a wire harness. In this case, it is troublesome to braid the electrical wires.

Accordingly, an object is to provide a technique capable of providing flexibility to a wiring member with a simple structure.

Means to Solve the Problem

A wiring member according to the present disclosure is a wiring member including: at least one wire-like transmission member having a zigzag section extending in a zigzag form; and a flexible base material having an arrangement surface, wherein the zigzag section is disposed on the arrangement surface, and the base material keeps the zigzag section in a zigzag form.

Effects of the Invention

According to the present disclosure, the wiring member can have flexibility with a simple structure.

DESCRIPTION OF EMBODIMENT(S)

Description of Embodiment of Present Disclosure

Figure 1:
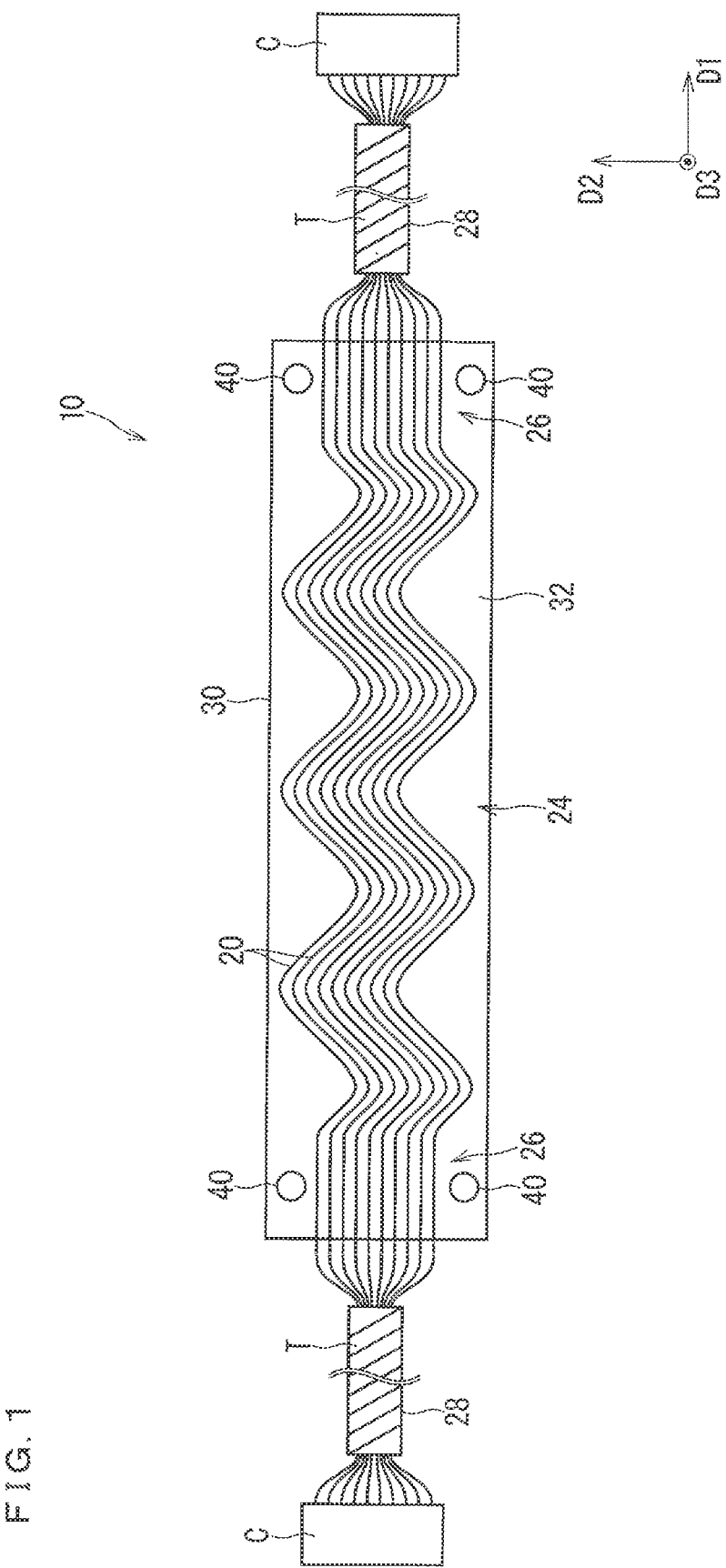
FIG. 1 is a plan view illustrating a wiring member according to an embodiment 1.

Embodiments of the present disclosure are listed and described firstly.

A wiring member according to the present disclosure is as follows.

(1) A wiring member includes: at least one wire-like transmission member having a zigzag section extending in a zigzag form; and a flexible base material having an arrangement surface, wherein the zigzag section is disposed on the arrangement surface, and the base material keeps the zigzag section in a zigzag form. The zigzag section of the wire-like transmission member is provided on the arrangement surface of the flexible base material, thus both the base material and the wire-like transmission member can expand and contract. Accordingly, the wiring member can have flexibility with a simple structure.

(2) In the wiring member according to (1), the base material may be a cloth or an elastic sheet. Accordingly, a simple member can be used as the base material.

(3) It is also applicable that the wiring member according to (1) or (2) further includes attachment members for attaching the wiring member to an attaching target, wherein the attachment members are provided to a first position and a second position away from each other along an extension direction of the wire-like transmission member, and the zigzag section is provided to at least a section between the first position and the second position. Accordingly, the section between the first position and the second position can be a traveling section, thus the wiring member can be attached to the attaching target without reducing flexibility of the wiring member as much as possible.

(4) In the wiring member according to (3), it is also applicable that the plurality of wire-like transmission members are provided, and the plurality of wire-like transmission members are bundled into a circular shape on a side closer to an end portion in relation to each of the attachment members. Accordingly, the plurality of wire-like transmission members can extend toward the end portion while being bundled into the circular shape.

(5) In the wiring member according to (3), it is applicable that a straight section kept in a straight shape is provided on the side closer to the end portion in relation to each of the attachment members, the plurality of wire-like transmission members are provided, and the plurality of wire-like transmission members are kept in a flat form in the straight section. Accordingly, the plurality of wire-like transmission members can extend toward the end portion in the flat form. Accordingly, reduction in height of the wiring member can be achieved.

(6) In the wiring member according to anyone of (1) to (5), it is applicable that the plurality of wire-like transmission members are provided, and the plurality of wire-like transmission members are disposed in a flat form on the arrangement surface in the zigzag section. Accordingly, the wiring module can be flattened in the zigzag section. Accordingly, reduction in height of the wiring member can be achieved. When the wiring member is disposed to extend over two members rotatably connected to each other, the wiring member is disposed so that the plurality of wire-like transmission members are arranged in a direction of a rotation axis, thus a difference of a distance hardly occurs between the plurality of wire-like transmission members at a time of rotation.

(7) In the wiring member according to any one of (1) to (6), the wire-like transmission member may be movably held on the base material in the zigzag section. Accordingly, one of the base material and the wire-like transmission member hardly interferes with expansion and contraction of the other one thereof, thus flexibility of the wiring member increases.

(8) A device with a movable part according to the present disclosure is a device with a movable part, including: the wiring member according to any one of (1) to (7); and an attaching target including a movable part, wherein the movable part includes a first portion and a second portion rotatably connected to the first portion, the wiring member is attached to each of the first portion and the second portion, and the zigzag section is located between an attachment position where the wiring member is attached to the first portion and an attachment position where the wiring member is attached to the second portion. The zigzag section is located between the attachment position on the first portion and the attachment position on the second portion, thus even when a route length between the attachment positions is changed at a time of rotation of the first portion and the second portion, a route difference thereof can be absorbed by expanding and contracting the wiring member. Accordingly, the wiring member hardly slacks at the time of rotation of the first portion and the second portion.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 2:
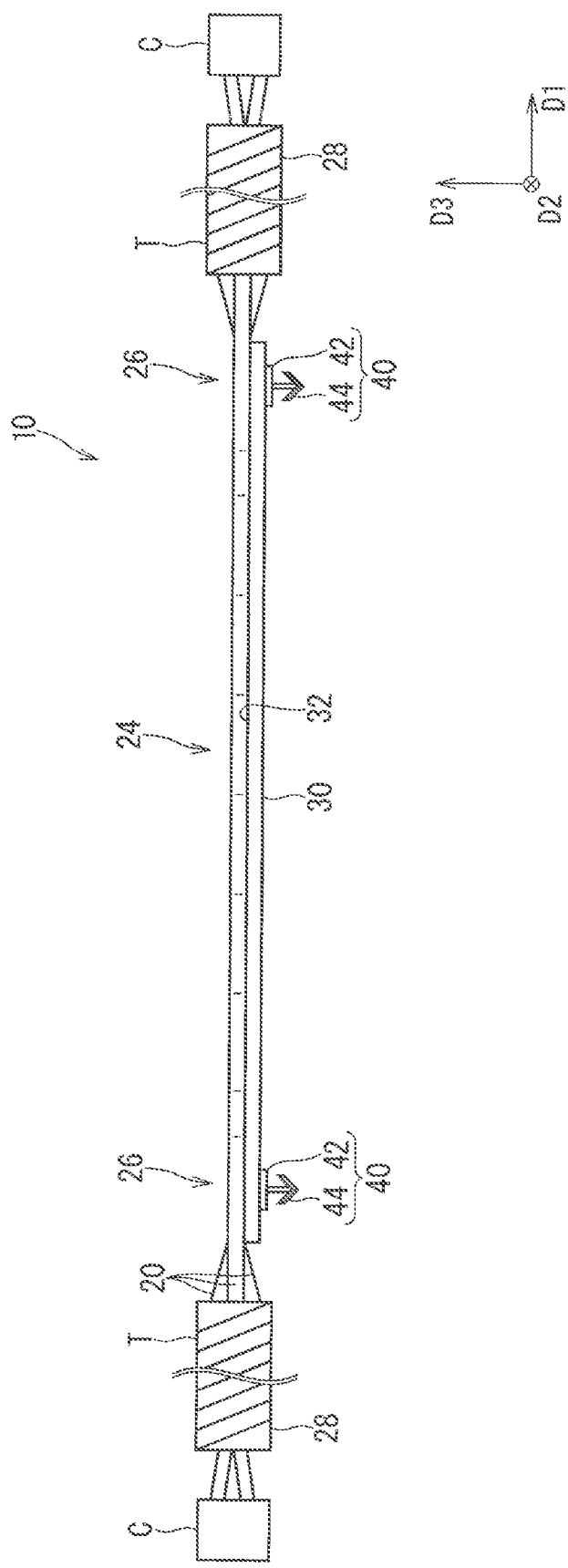
FIG. 2 is a side view illustrating the wiring member according to the embodiment 1.

A wiring member according to an embodiment 1 is described hereinafter. FIG. 1 is a plan view illustrating the wiring member 10 according to the embodiment 1. FIG. 2 is a side view illustrating the wiring member 10 according to the embodiment 1.

The wiring member 10 includes a wire-like transmission member 20 and a base material 30. Herein, the wiring member 10 further includes an attachment member 40.

The wire-like transmission member 20 is a wire-like member transmitting electrical power or light, for example. For example, the wire-like transmission member 20 may be a general wire having a core wire and a covering around the core wire, or may also be a shielded wire, an electrical cable, an enamel wire, a nichrome wire, or an optical fiber cable. The wire-like transmission member 20 includes a transmission wire body 21 and a covering layer 22 (refer to FIG. 7). The transmission wire body 21 is a portion transmitting electrical power or light. The transmission wire body 21 corresponds to a conductor core wire in the electrical wire, and corresponds to a core and a clad in an optical fiber cable. The covering layer 22 covers the transmission wire body 21. The covering layer 22 is formed of a resin material extruded around the transmission wire body 21 to cover it, for example. A type of the resin material is not particularly limited, but polyvinyl chloride (PVC), polyethylene (PE), polypropylene (PP), or polyethylene terephthalate (PET) can be adopted, for example. The wire-like transmission member 20 is a flexible member which can be bended and deformed.

The wire-like transmission member 20 transmitting the electrical power may be various kinds of signal lines or various kinds of power lines. Some of the wire-like transmission members 20 transmitting the electrical power may be used as an antenna or coil, for example, transmitting or receiving a signal or electrical power to or from a space. The wire-like transmission member 20 may be a single wire-like object or a composite object of a plurality of wire-like objects (a twisted wire and a cable made up of a plurality of wire-like objects covered by a sheath). When the wire-like transmission member 20 is a cable, a sheath is also included in the covering layer 22.

It is sufficient that the number of the wire-like transmission members 20 is at least one, thus one or the plurality of wire-like transmission members 20 are also applicable. In the example illustrated in FIG. 1, ten wire-like transmission members 20 are included.

The plurality of wire-like transmission members 20 are assumed to be members connecting components in a vehicle. An end portion of the wire-like transmission member 20 extends from an end portion of the base material 30 to be located on an outer side of the base material 30. An intermediate portion of the wire-like transmission member 20 except for the end portion is disposed on the base material 30. A connector C, for example, is provided on an end portion of the wire-like transmission member 20. This connector C is connected to a connector provided in the other side component, thus the wire-like transmission member 20 is connected to the other side component. That is to say, the present wiring member 10 is used as the wiring member 10 electrically connecting various types of component in a vehicle, for example (or connecting them so that they can perform optical communication). The end portion of the wire-like transmission member 20 may also be located on the base material 30. The connector C may be fixed to the base material 30.

The base material 30 includes an arrangement surface 32. Herein, the base material 30 is formed into a sheet-like shape, and one main surface of the base material 30 is the arrangement surface 32. The wire-like transmission member 20 is disposed on the arrangement surface 32. The base material 30 can expand and contract. The base material 30 is a member having higher flexibility than the wire-like transmission member 20. The wire-like transmission member 20 includes the transmission wire body 21, thus has lower flexibility than the base material 30. For example, the base material 30 is a cloth or an elastic sheet having flexibility.

The cloth is a woven fabric, a braided fabric, or a non-woven cloth, for example. Typically, the cloth is a member formed into a sheet-like shape using fibers or threads, for example. The cloth has flexibility by entangling of the fibers or threads. For example, the woven fabric is formed by entangling a warp thread and a weft thread. In the woven fabric, flexibility in a direction oblique to a direction in which the warp thread and the weft thread intersect with each other is generally higher than flexibility in a direction in which the warp thread and the weft thread extend. The braided fabric is formed by entangling a thread with a loop formed by the other thread. The braided fabric has this loop, thus generally has higher flexibility than the woven fabric. The non-woven cloth is formed by stacking webs formed by entangling fibers in layers. The non-woven cloth includes fibers extending in a random direction, thus has flexibility. It is also applicable that fibers or threads in the cloth are formed by an elastic material such as elastomer, thus the cloth has flexibility.

The elastic sheet is a sheet made up of an elastic material such as elastomer. In the present disclosure, a sheet formed by entangling fibers or threads made up of an elastic material is the cloth. The elastic sheet of the present disclosure does not include the sheet formed by entangling the fibers or the threads. For example, the elastic sheet may be a foam sheet. The elastic sheet may be a sheet having a filled cross-sectional surface (referred to as a solid sheet hereinafter), for example. For example, the elastic sheet may be a meshed sheet having a main surface with numerous holes.

The wire-like transmission member 20 is attached to the base material 30. Any attaching means is applicable as a means of attaching the wire-like transmission member 20 and the base material 30. Applicable as the means of attaching the wire-like transmission member 20 and the base material 30 are a contact area fixation and a non-contact area fixation, or both fixations may be used together. Herein, the contact area fixation indicates that a portion where the wire-like transmission member 20 and the base material 30 have contact with each other is stuck and fixed. The non-contact area fixation is a fixing state which is not the contact area fixation, and indicates that a sewing thread, a cover, or an adhesive tape presses the wire-like transmission member 20 toward the base material 30 or sandwiches the wire-like transmission member 20 and the base material 30 to keep them in a fixing state.

Applicable as the configuration of the contact area fixation are a contact area indirect fixation and a contact area direct fixation, or both fixations may also be used together in different regions. Herein, the contact area indirect fixation indicates that the wire-like transmission member 20 and the base material 30 are indirectly stuck and fixed via an adhesive agent, a gluing agent, and a double-sided adhesive tape provided therebetween. The contact area direct fixation indicates that the wire-like transmission member 20 and the base material 30 are directly stuck and fixed without an intervention of the adhesive agent, for example, which is separately provided. Considered in the contact area direct fixation is that resin included in at least one of the wire-like transmission member 20 and the base material 30 is melted, thus the wire-like transmission member 20 and the base material 30 are stuck and fixed, for example.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as fusion can be used. For example, when the contact area direct fixation by heat is formed by fusion, adoptable are various types of fusion means such as ultrasonic fusion, heating pressurizing fusion, hot air fusion, and high-frequency fusion. When the state of the contact area direct fixation is formed by these means, the wire-like transmission member 20 and the base material 30 are in the state of the contact area direct fixation by these means. Specifically, when the state of the contact area direct fixation is formed by the ultrasonic fusion, for example, the wire-like transmission member 20 and the base material 30 are in the state of the contact area direct fixation by the ultrasonic fusion.

The wire-like transmission member 20 and the base material 30 may be wholly and continuously fixed to each other along an extension direction of the wire-like transmission member 20. The wire-like transmission member 20 and the base material 30 may be intermittently fixed to each other to partially include a section not fixed along the extension direction of the wire-like transmission member 20. In the case of the non-contact area fixation, the plurality of wire-like transmission members 20 may be fixed one by one or in sets of several wire-like transmission members 20, or all of the plurality of wire-like transmission members 20 may be collectively fixed.

As illustrated in FIG. 1, two directions parallel to the arrangement surface 32 and perpendicular to each other are referred to as a first direction D1 and a second direction D2, and a direction perpendicular to the arrangement surface 32 is referred to as a third direction D3. The first direction D1 is a direction in which the wire-like transmission member 20 extends on the arrangement surface 32. The second direction D2 is a direction in which the plurality of wire-like transmission members 20 are parallelly arranged on the arrangement surface 32. A dimension of the base material 30 along the first direction D1 is larger than that along the second direction D2. The third direction D3 is a thickness direction of the wiring member 10.

The wire-like transmission member 20 includes a zigzag section 24. The zigzag section 24 is a section in which the wire-like transmission member 20 extends in a zigzag form. The zigzag section 24 is disposed on the arrangement surface 32. The base material 30 keeps the zigzag section 24 in the zigzag form. In the zigzag section 24, the wire-like transmission member 20 is repetitively bended to a direction intersecting the first direction D1 (herein, the second direction D2) on a way of extending in the first direction D1 several times. A route of the wire-like transmission member 20 in the zigzag section 24 is a detour route longer than a shortest route in the first direction D1. This zigzag section 24 is disposed on the base material 30, thus the wiring member 10 has flexibility in the first direction D1.

When there is directionality in the flexibility of the base material 30, that is to say, when the base material 30 has a high flexibility direction and a low flexibility direction, it is sufficient that the wire-like transmission member 20 is disposed on the arrangement surface 32 so that the high flexibility direction is the first direction D1. For example, when the base material 30 is the woven fabric, the first direction D1 is preferably an oblique direction intersecting with both the warp thread and the weft thread. For example, when the base material 30 is the braided fabric, it is applicable that the first direction D1 is a course direction or a wale direction, or may also be an oblique direction intersecting with both the course direction and the wale direction. Herein, in the braided fabric, the course direction indicates a direction along a row in which loops are arranged in a lateral direction, and the wale direction indicates a direction along a row in which loops are arranged in a vertical direction.

Figure 3:
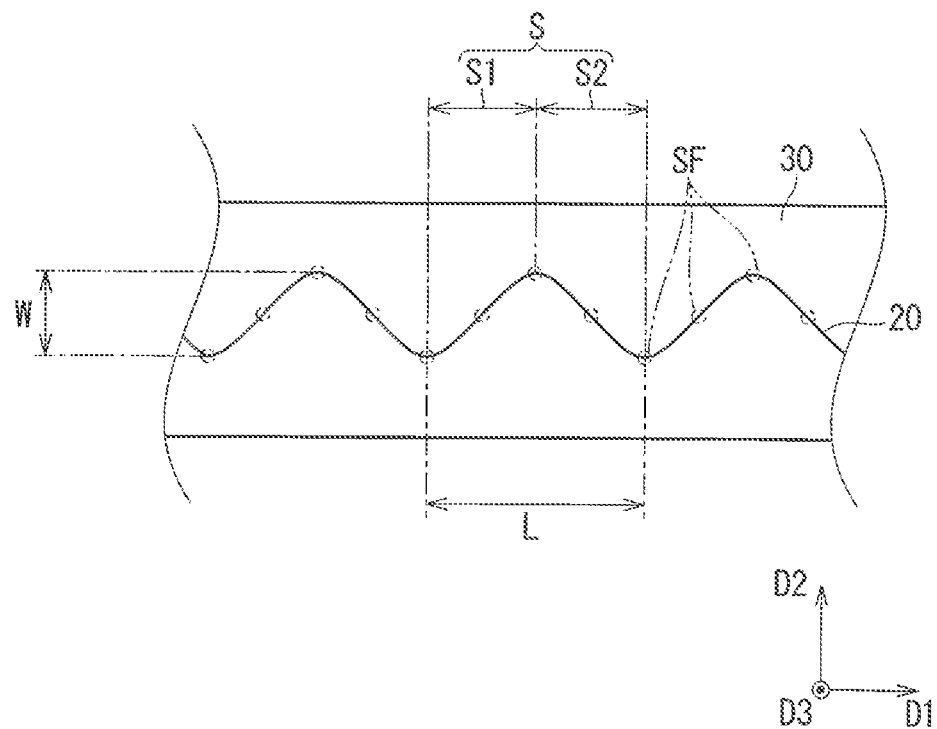
FIG. 3 is a schematic view illustrating an example of an attachment form of attaching a base material and a wire-like transmission member.
Figure 4:
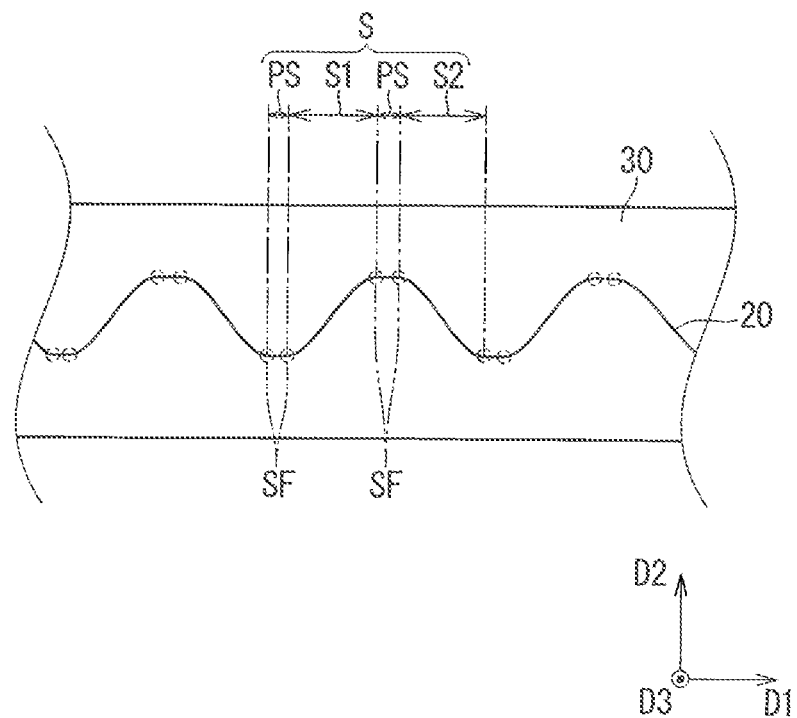
FIG. 4 is a schematic view illustrating an example of an attachment form of attaching the base material and the wire-like transmission member.
Figure 5:
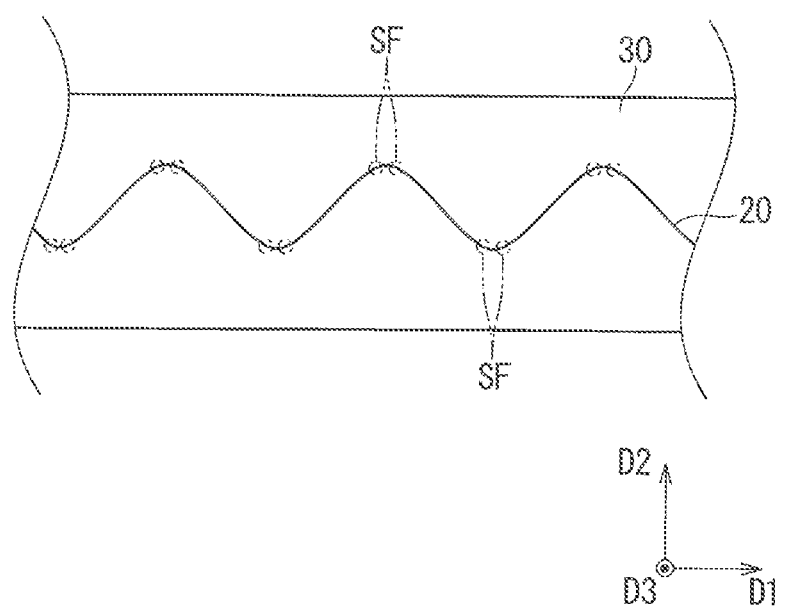
FIG. 5 is a schematic view illustrating an example of an attachment form of attaching the base material and the wire-like transmission member.

An attachment form of attaching the base material 30 and the wire-like transmission member 20 is described with reference to FIG. 3 to FIG. 5. FIG. 3 to FIG. 5 are schematic views each illustrating an example of the attachment form of attaching the base material 30 and the wire-like transmission member 20. FIG. 3 to FIG. 5 representatively illustrate one of the plurality of wire-like transmission members 20.

The wire-like transmission member 20 has periodicity in the zigzag section 24. Specifically, the zigzag section 24 includes a shift section S. The shift section S is a section extending along a direction intersecting with the first direction D1 (herein, the second direction D2). The shift section S is a section in which the wire-like transmission member 20 does not extend in parallel to the first direction D1. Herein, the shift section S includes a first shift section S1 and a second shift section S2. When the route of the wire-like transmission member 20 is traced from one side (a left side of a paper sheet of FIG. 3) toward the other side (a right side of the paper sheet of FIG. 3) along the first direction D1, the first shift section S1 is a section in which the wire-like transmission member 20 extends from one end side (a lower side of the paper sheet of FIG. 3) toward the other end side (an upper side of the paper sheet of FIG. 3) of the base material 30, and the second shift section S2 is a section in which the wire-like transmission member 20 extends from the other end side (an upper side of the paper sheet of FIG. 3) toward one end side (a lower side of the paper sheet of FIG. 3) of the base material 30. A length dimension of the first shift section S1 and a length dimension of the second shift section S2 have the same value. The length dimension of the first shift section S1 and the length dimension of the second shift section S2 may have values different from each other. The section including one group of first shift section S1 and the second shift section S2 is a section corresponding to one cycle of the zigzag section 24.

A dimension L illustrated in FIG. 3 is a length dimension of the section corresponding to one cycle of the zigzag section 24 along the first direction D1. Herein, the length dimension L of the zigzag section 24 is a sum of the length dimension of the first shift section S1 and the length dimension of the second shift section S2 along the first direction D1. Any value is applicable to the length dimension L of the zigzag section 24. A dimension W illustrated in FIG. 3 is a width dimension of the zigzag section 24. Any value is applicable to the width dimension W of the zigzag section 24. As the width dimension W of the zigzag section 24 gets larger, flexibility of the wiring member 10 increases. As the width dimension W of the zigzag section 24 gets smaller, flexibility of the wiring member 10 decreases. The width dimension of the wiring member 10 can be reduced. The width dimension W of the zigzag section 24 may be larger or smaller than the length dimension L of one cycle of the zigzag section 24, or may also be the same as that of the zigzag section 24.

In the example illustrated in FIG. 3, the wire-like transmission member 20 is disposed on the arrangement surface 32 to draw a sine curve in the zigzag section 24. Thus, the wire-like transmission member 20 extends on the arrangement surface 32 toward the direction intersecting with the first direction D1 and the second direction D2 in the zigzag section 24. The zigzag section 24 is made up of only the shift section S. The wire-like transmission member 20 does not have a section extending on the arrangement surface 32 in parallel to the first direction D1 in the zigzag section 24. However, as with the example illustrated in FIG. 4, the wire-like transmission member 20 may have a parallel section P extending on the arrangement surface 32 in parallel to the first direction D1 in the zigzag section 24.

The parallel section P is provided between the shift sections S. The section corresponding to one cycle of the zigzag section 24 includes the shift section S and the parallel section P. In the example illustrated in FIG. 4, the parallel section P is provided between the first shift section S1 and the second shift section S2. The section corresponding to one cycle of the zigzag section 24 includes the first shift section S1, the second shift section S2, and two parallel sections P. The parallel section P may be provided halfway through the first shift section S1 or the second shift section S2. Any value is applicable to the length dimension of the parallel section P along the first direction D1. The length dimension of the parallel section P along the first direction D1 may be larger or smaller than that of the first shift section S1 or the second shift section S2 along the first direction D1, or may also be equal to that of the first shift section S1 or the second shift section S2. The length dimension of the parallel section P along the first direction D1 may be larger or smaller than the width dimension W of the zigzag section 24, or may also be equal to the width dimension W of the zigzag section 24.

The wire-like transmission member 20 may extend on the arrangement surface 32 in parallel to the second direction D2 in the shift section S. In this case, for example, the zigzag section may have a shape in which a U-like shape and a reversed U-like shape are combined or a shape in which an L-like shape and a reversed L-like shape are combined in a plan view. The wire-like transmission member 20 may extend on the arrangement surface 32 to return to the first direction D1 in the shift section S. In this case, for example, the zigzag section may have a shape in which a C-like shape and a reversed C-like shape are combined in a plan view.

The plurality of wire-like transmission members 20 are disposed in a flat form on the arrangement surface 32 in the zigzag section 24. It is sufficient that the plurality of wire-like transmission members 20 are arranged in a row on the arrangement surface 32 in the zigzag section 24. It is sufficient that when the plurality of wire-like transmission members 20 are separately arranged in a plurality of rows on the arrangement surface 32 in the zigzag section 24, the height dimension is smaller than the dimension along the parallel direction.

In the example illustrated in FIG. 3, the plurality of wire-like transmission members 20 are disposed so that a phase thereof is aligned in the zigzag section 24. The plurality of wire-like transmission members 20 may be disposed so that a phase thereof is shifted in the zigzag section 24. For example, the plurality of wire-like transmission members 20 may be disposed so that a phase of some of the plurality of wire-like transmission members 20 is opposite to that of the other some of the plurality of wire-like transmission members 20. In this case, some wire-like transmission members 20 are disposed to be symmetrical about a line parallel to the first direction D1 with respect to the other some wire-like transmission members 20 in the zigzag section 24.

The wire-like transmission member 20 is movably held on the base material 30 in the zigzag section 24. For example, when the means of attaching the wire-like transmission member 20 and the base material 30 is the non-contact area fixation by a thread or a cover, the wire-like transmission member 20 can be wholly moved with respect to the base material 30 along the extension direction. For example, when the means of attaching the wire-like transmission member 20 and the base material 30 is the contact area fixation or the non-contact area fixation by an adhesive tape, the wire-like transmission member 20 includes a section not partially fixed along the extension direction, thus can be moved with respect to the base material 30 in the section.

FIG. 3 to FIG. 5 illustrate a spot fixing part SF of the wire-like transmission member 20 and the base material 30 in a case where the means of attaching the wire-like transmission member 20 and the base material 30 is the contact area fixation or the non-contact area fixation by the adhesive tape by a dashed-two dotted line. The spot fixing part SF is a portion where a part of the wire-like transmission member 20 along the extension direction is fixed to the base material 30. The spot fixing part SF is provided in a plurality of positions at intervals along the extension direction of the wire-like transmission member 20.

The spot fixing part SF may be provided in any position, however, it is sufficient that the spot fixing part SF is provided so that the whole shift section S is not the spot fixing part SF. For example, in the example illustrated in FIG. 3, the spot fixing part SF is provided in a portion where the first shift section S1 and the second shift section S2 are connected to each other. The spot fixing part SF is provided in an intermediate portion of the first shift section S1 and an intermediate portion of the second shift section S2. In the example illustrated in FIG. 4, the spot fixing part SF is provided in a portion where the first shift section S1 and the parallel section P are connected and a portion where the second shift section S2 and the parallel section P are connected to each other. In the example illustrated in FIG. 5, the spot fixing part SF is provided in both end portions of the first shift section S1 and both end portions of the second shift section S2. Accordingly, in the example illustrated in FIG. 5, the spot fixing part SF is provided on both sides of the portion where the first shift section S1 and the second shift section S2 are connected to each other.

The wire-like transmission member 20 and the base material 30 are integrally moved in a position of the spot fixing part SF. The wire-like transmission member 20 and the base material 30 are independently moved in a position between two spot fixing parts SF.

The attachment member 40 is a member for attaching the wiring member 10 to an attaching target 80. Herein, the attachment member 40 is provided in the first position and the second position away from each other along the extension direction of the wire-like transmission member 20. The zigzag section 24 is provided in at least a section between the first position and the second position. The attachment member 40 includes a first attachment part 42 and a second attachment part 44. The first attachment part 42 is a portion attached to the wire-like transmission member 20 or the base material 30. The second attachment part 44 is a portion attached to an attaching target. In the example illustrated in FIG. 2, the second attachment part 44 protrudes to an outer side of a surface on a side opposite to the arrangement surface 32 along the third direction D3. The second attachment part 44 may protrude to an outer side of the arrangement surface 32 along the third direction D3.

In the example illustrated in FIG. 3, the attachment member 40 is a clamp. Any attaching means is applicable as a means of attaching the first attachment part 42 and the base material 30 or the wire-like transmission member 20, and an attaching means such as the contact area fixation or non-contact area fixation described in the means of attaching the wire-like transmission member 20 and the base material 30 is also applicable. Herein, the first attachment part 42 is attached to the base material 30. The second attachment part 44 includes a columnar part and a locking piece. The locking piece is elastically deformed, thus the second attachment part 44 is formed to be able to be inserted into and locked to an attachment hole formed in an attaching target.

A straight section 26 is provided adjacent to the zigzag section 24 in the wire-like transmission member 20. In the straight section 26, the plurality of wire-like transmission members 20 extend straight along the first direction D1 on the base material 30. It is sufficient that the straight section 26 may be provided halfway through the first shift section S1 or the second shift section S2. Accordingly, a space for providing the attachment member 40 is easily ensured on both sides of the straight section 26 along the width direction of the base material 30. The attachment member 40 is provided to the straight section 26. The attachment member 40 is provided in positions on both sides of the plurality of wire-like transmission members 20 along the width direction of the base material 30.

The plurality of wire-like transmission members 20 are bundled into a circular shape on a side closer to the end portion (a side of the connector C) in relation to the attachment member 40. A section where the plurality of wire-like transmission members 20 are bundled into the circular shape is referred to as a circular bundle section 28. Herein, the straight section 26 extends to an outer edge of the base material 30, and the circular bundle section 28 is provided on a side of the end portion of the wire-like transmission member 20. Herein, the circular bundle section 28 is provided on both sides of the zigzag section 24.

In the example illustrated in FIG. 1, a portion where the plurality of wire-like transmission members 20 are bundled into the circular shape is not held on the base material 30. In this case, it is sufficient that the plurality of wire-like transmission members 20 are bundled into the circular shape by a banding member such as a tape T or a banding band. The portion where the plurality of wire-like transmission members 20 are bundled into the circular shape may be held on the base material 30. In this case, the banding member may keep the base material 30 in a bundled state, or the end portion of the base material 30 in a circumferential direction may be held by an adhesive agent or fusion, for example.

Figure 6:
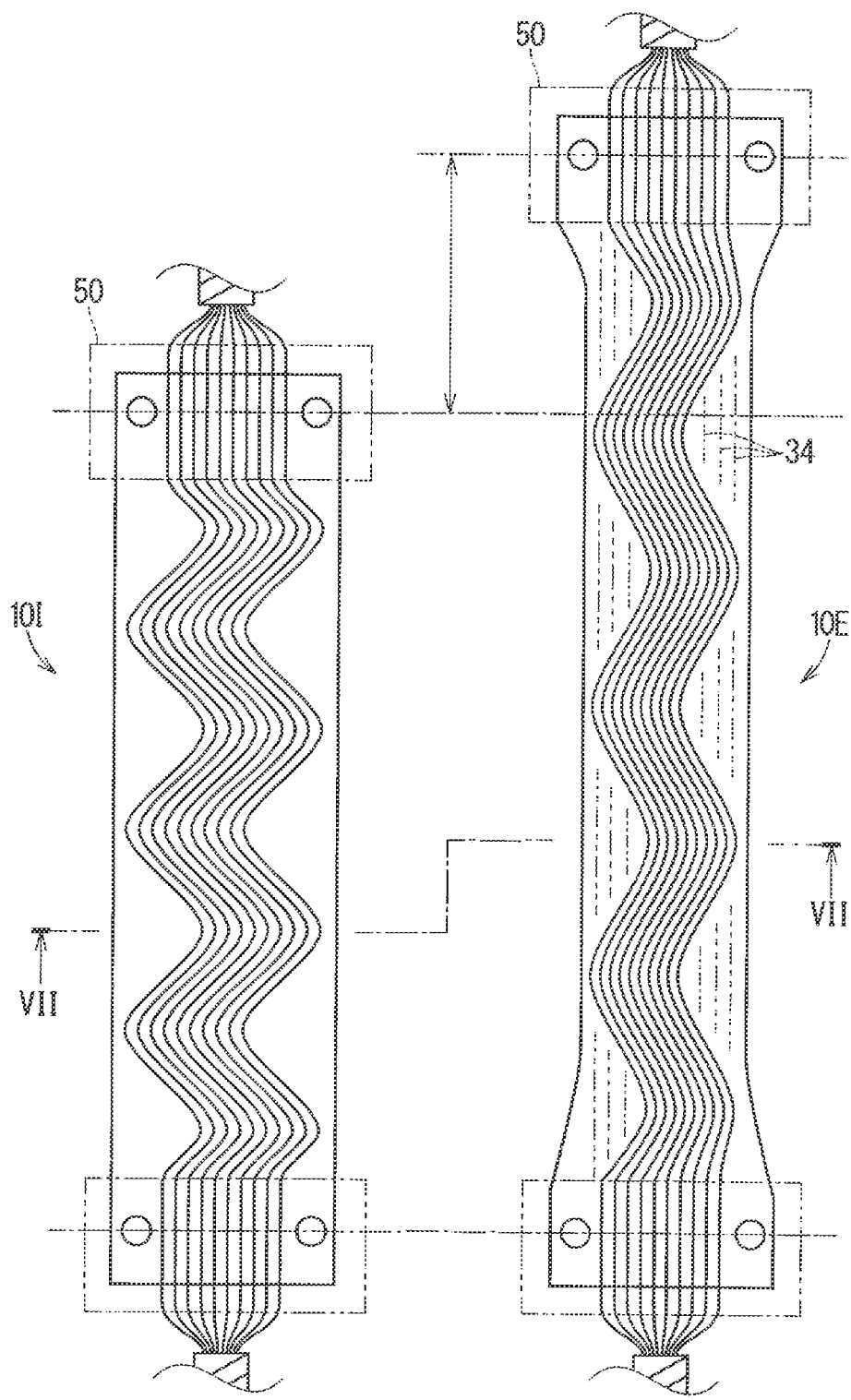
FIG. 6 is an explanation diagram illustrating that the wiring member expands and contracts.
Figure 7:
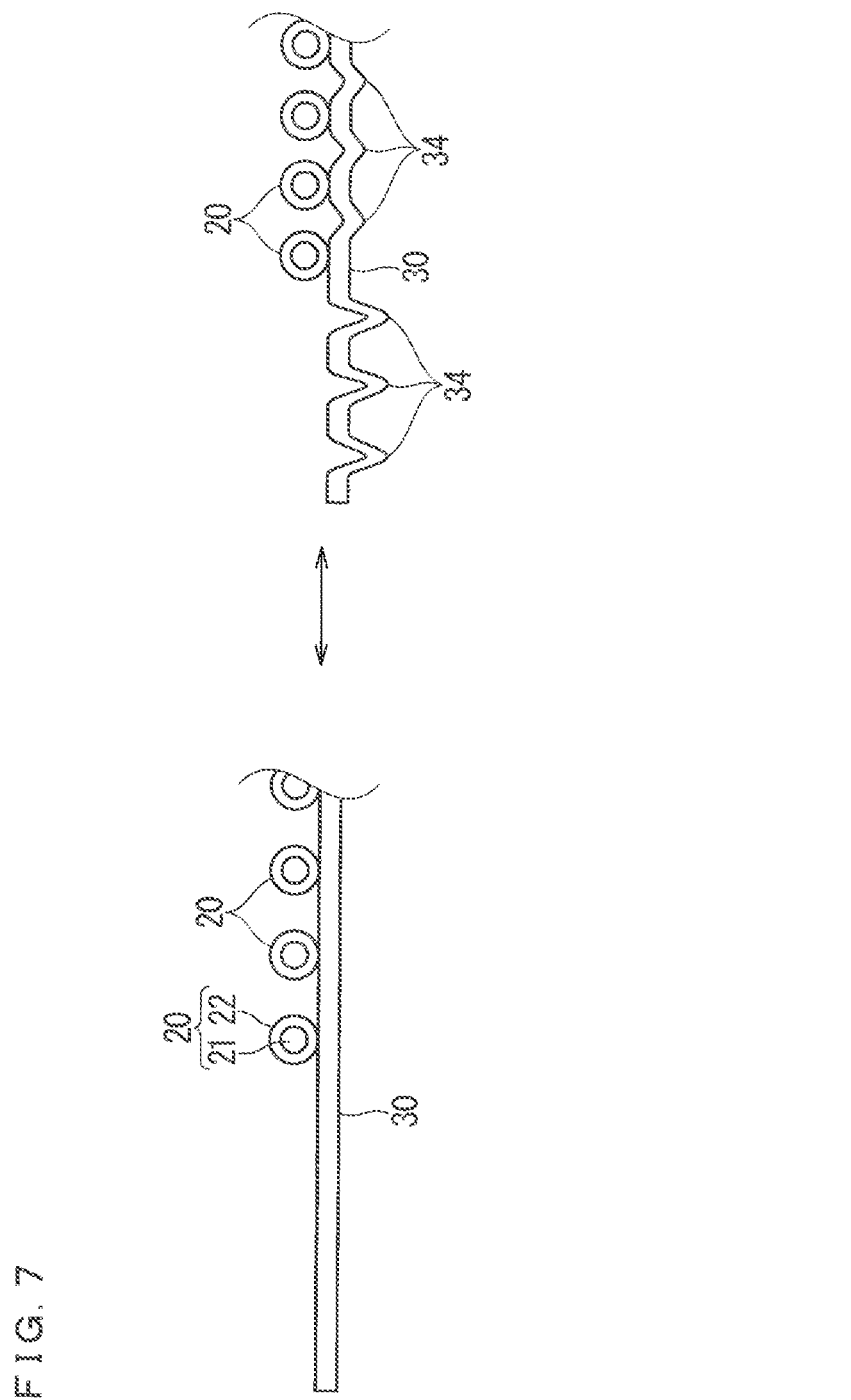
FIG. 7 is a cross-sectional view of the wiring member cut along a VII-VII line in FIG. 6.

FIG. 6 is an explanation diagram illustrating that the wiring member 10 expands and contracts. FIG. 7 is a cross-sectional view along a VII-VII line in FIG. 6.

The wiring member 10 can be deformed to extend, and also can be deformed to be restored from extensional deformation. The wiring member 10 on a left side of FIG. 6 illustrates the wiring member 10 in an initial state (a state restored from the extensional state), and the wiring member 10 on a right side of FIG. 6 illustrates the wiring member 10 in the extensional state. In the description hereinafter, the wiring member 10 in the initial state is referred to as a wiring member 10I, and the wiring member 10 in the extensional state is referred to as a wiring member 10E in some cases. Herein, the initial state is a state where the wiring member 10 does not extend. It is also considered that the wiring member 10 is always in the extensional state while the wiring member 10 is attached to an attaching target, and the wiring member 10 is deformed so that a degree of extension is changed. In this case, a state where the degree of extension of the wiring member 10 is lowest may be the initial state.

The wiring member 10 is deformed to extend and deformed to be restored in the first direction D1. The wiring member 10I is deformed to extend in the first direction D1 to be the wiring member 10E, and the wiring member 10E is deformed to be restored in the first direction D1 to be the wiring member 10I. When the wiring member 10I is deformed to extend to be the wiring member 10E, in the zigzag section 24 of the wire-like transmission member 20 and the base material 30, a dimension in the first direction D1 gets large, and in contrast, a dimension in the second direction D2 gets small. The route of the wire-like transmission member 20 in the zigzag section 24 of the wiring member 10E is closer to a straight shape along the first direction D1 than the route of the wire-like transmission member 20 in the zigzag section 24 of the wiring member 10I. The base material 30 has flexibility in the first direction D1, thus does not interfere with deformation of the wire-like transmission member 20. In the wiring member 10E, a crimp 34 may occurs in a part of the base material 30 along the width direction. As illustrated in FIG. 7, the base material 30 may be bended in the thickness direction in a portion of the crimp 34 and formed into a zigzag shape.

When the wiring member 10E is deformed to be restored to be the wiring member 10I, the base material 30 is deformed to be restored by flexibility of itself. At this time, the wire-like transmission member 20 is held on the base material 30, thus the route of the zigzag section 24 of the wire-like transmission member 20 can be restored to be the initial state upon receiving force of restoring the base material 30.

As illustrated in FIG. 7, the plurality of wire-like transmission members 20 may be provided at intervals in a parallel direction in the initial state. Accordingly, the base material 30 can be deformed so that intervals of the plurality of wire-like transmission members 20 is narrowed in the wiring member 10E. The crimp 34 may also occur between the plurality of wire-like transmission members 20 in the wiring member 10E.

External force of deforming and extending the wiring member 10 in the first direction D1 is assumed to be applied to a position of the attachment member 40. That is to say, when the attaching target of the attachment member 40 is moved, external force of deforming and extending the wiring member 10 in the first direction D1 is applied to the wiring member 10. When the attachment member 40 is provided to the base material 30, as illustrated in FIG. 6, a rigid body 50 extending more hardly than the base material 30 may be partially provided in the position of the attachment member 40. The rigid body 50 may also be provided to connect two attachment members 40 along the width direction of the base material 30. The rigid body 50 may also be provided to connect one end portion and the other end portion along the width direction of the base material 30. The rigid body 50 is provided, thus a position in the base material 30 provided with the attachment member 40 can be reinforced. The rigid body 50 is a sheet material 60, for example. The rigid body 50 may be the first attachment part 42 of the attachment member 40.

When the attachment member 40 is a clip, for example, external force may be locally applied to the position of the second attachment part 44. Even in this case, the external force can be uniformly applied along the width direction of the base material 30 by providing the rigid body 50.

<Device with Movable Part Including Wiring Member>

Figure 8:
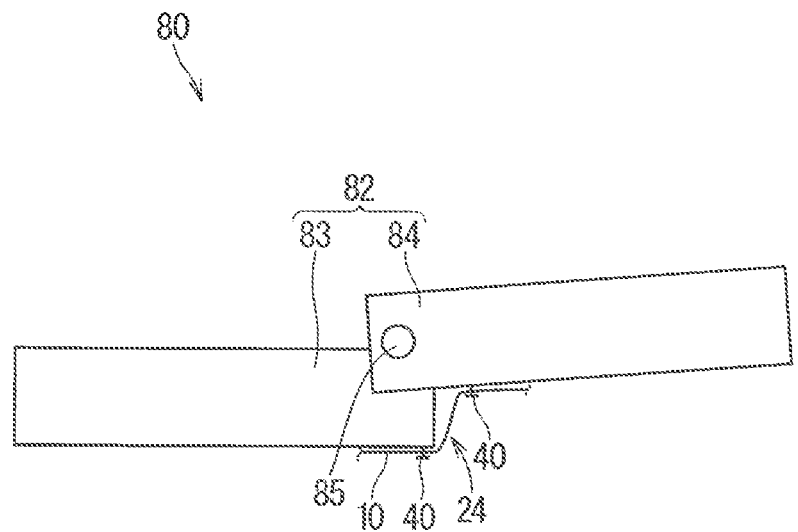
FIG. 8 is a side view illustrating a device with a movable part including the wiring member.
Figure 9:
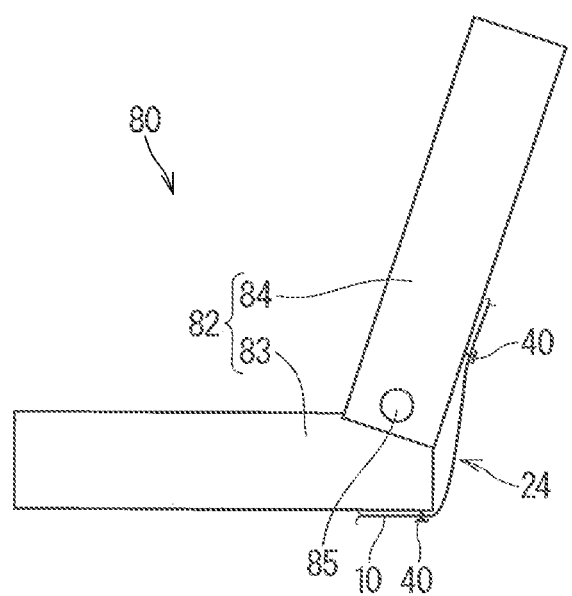
FIG. 9 is an explanation diagram illustrating the movable part movable from a state in FIG. 8.
Figure 10:
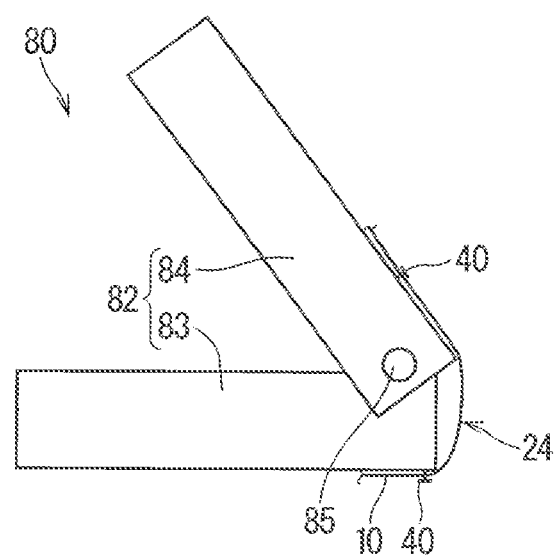
FIG. 10 is an explanation diagram illustrating the movable part movable from the state in FIG. 8.

FIG. 8 is a side view illustrating a device with a movable part 82 including the wiring member 10. FIG. 9 and FIG. 10 are explanation diagrams each illustrating the movable part 82 movable from the state in FIG. 8.

The device with the movable part 82 includes the wiring member 10 and an attaching target 80. The attaching target 80 includes the movable part 82. The movable part 82 includes a first portion 83 and a second portion 84. The second portion 84 is connected to the first portion 83 so as to be rotatable around a rotation axis 85. The wiring member 10 is attached to each of the first portion 83 and the second portion 84. The zigzag section 24 is located between an attachment position on the first portion 83 and an attachment position on the second portion 84. The wiring member 10 may also be attached so that a surface thereof on a side opposite to the arrangement surface 32 is directed to a side of the attaching target 80. The wiring member 10 may also be attached so that the arrangement surface 32 is directed to the side of the attaching target 80.

The attaching target 80 is assumed to include the movable part 82 in a vehicle. For example, the attaching target 80 may be a seat or a door and a vehicle body. In the description hereinafter, the attaching target 80 is the seat 80 in a vehicle. The first portion 83 in the movable part 82 is a seat body 83 including a seat surface. The second portion 84 in the movable part 82 is a backrest 84. In the seat body 83, a surface directed to a side opposite to the seat surface is referred to as a lower surface. In the backrest 84, a surface directed to a side of a passenger sitting on the seat surface is referred to as one main surface, and a surface directed to a side opposite to one main surface is referred to as the other main surface. For example, the wiring member 10 may be attached to the lower surface of the seat body 83 and the other main surface of the backrest 84. In this case, the wiring member 10 is attached to an outer peripheral side of the rotation axis 85 around which the backrest 84 is rotated with respect to the seat body 83.

As illustrated in FIG. 8, in the seat 80, a route length of the wiring member 10 between the attachment position on the seat body 83 and the attachment position on the backrest 84 is shortest when the backrest 84 is tilted as much as possible on a side opposite to the seat body 83. In the seat 80, the backrest 84 is upstanding in a normal drive state as illustrated in FIG. 9. In this state, a route length of the wiring member 10 between the attachment position on the seat body 83 and the attachment position on the second portion 84 is longer than that in the state in FIG. 8. As illustrated in FIG. 10, in the seat 80, a route length of the wiring member 10 between the attachment position on the seat body 83 and the attachment position on the backrest 84 is longest when the backrest 84 is tilted as much as possible on the side of the seat body 83. It is sufficient that the wiring member 10 can expand and contract so as to be able to absorb a difference of the route length. That is to say, the wiring member 10 is in an initial state while the seat 80 is in the state in FIG. 8, and the wiring member 10 is in a maximum extensional state while the seat 80 is in the state in FIG. 10. It is sufficient that the wiring member 10 is in a region elastically deformed in this maximum extensional state of the wiring member 10.

A difference of the route length between the initial state and the maximum extensional state is determined in accordance with an angle range within which the backrest 84 can be rotated with respect to the seat body 83 and a distance from the rotation axis 85, for example. The angle range within which the backrest 84 can be rotated with respect to the seat body 83 and the distance from the rotation axis 85 have values appropriately designed by a vehicle type, for example. For example, the angle range within which the backrest 84 can be rotated with respect to the seat body 83 may be a range from 180 degrees (angle in the state in FIG. 8) to 60 degrees (angle in the state in FIG. 10). The distance from the rotation axis 85 may be set so that the wiring member 10 passes through the route on an outer side of the rotation axis 85 by 5 centimeters, for example. In these cases, the difference of the route length between the initial state and the maximum extensional state is approximately 10 centimeters. Accordingly, it is sufficient that the wiring member 10 can be elastically deformed within a range from 10 to 20 centimeters in the first direction D1.

According to the wiring member 10 having the above configuration, the zigzag section 24 of the wire-like transmission member 20 is provided on the arrangement surface 32 of the base material 30 which can expand and contract, thus both the base material 30 and the wire-like transmission member 20 can expand and contract. Accordingly, the wiring member 10 can have flexibility with a simple structure.

The base material 30 is the cloth or the elastic sheet. Accordingly, a simple member can be used as the base material 30.

The attachment member 40 is provided in the first position and the second position away from each other along the extension direction of the wire-like transmission member 20, and the zigzag section 24 is provided to at least the section between the first position and the second position. Accordingly, the section between the first position and the second position can be the traveling section, thus the wiring member 10 can be attached to the attaching target 80 without reducing flexibility of the wiring member 10 as much as possible.

The plurality of wire-like transmission members 20 are bundled into the circular shape on the side closer to the end portion in relation to the attachment member 40. Accordingly, the plurality of wire-like transmission members 20 can extend toward the end portion while being bundled into the circular shape.

The plurality of wire-like transmission members 20 are disposed in a flat form on the arrangement surface 32 in the zigzag section 24. Accordingly, the wiring member 10 can be flattened in the zigzag section 24. Accordingly, reduction in height of the wiring member 10 can be achieved. When the wiring member 10 is disposed to extend over two members rotatably connected to each other, the wiring member 10 is disposed so that the plurality of wire-like transmission members 20 are arranged in the direction of the rotation axis 85, thus a difference of the distance hardly occurs between the plurality of wire-like transmission members 20 at the time of rotation.

The wire-like transmission member 20 is movably held on the base material 30 in the zigzag section 24. Accordingly, one of the base material 30 and the wire-like transmission member 20 hardly interferes with expansion and contraction of the other one thereof, thus flexibility of the wiring member 10 increases.

According to the device with the movable part 82 including the wiring member 10 having the above configuration, the zigzag section 24 is located between the attachment position on the first portion 83 and the attachment position on the second portion 84, thus even when the route length between the attachment positions is changed at the time of rotation of the first portion 83 and the second portion 84, the route difference thereof can be absorbed by expanding and contracting the wiring member 10. Accordingly, the wiring member 10 hardly slacks at the time of rotation of the first portion 83 and the second portion 84.

Modification Example

Figure 11:
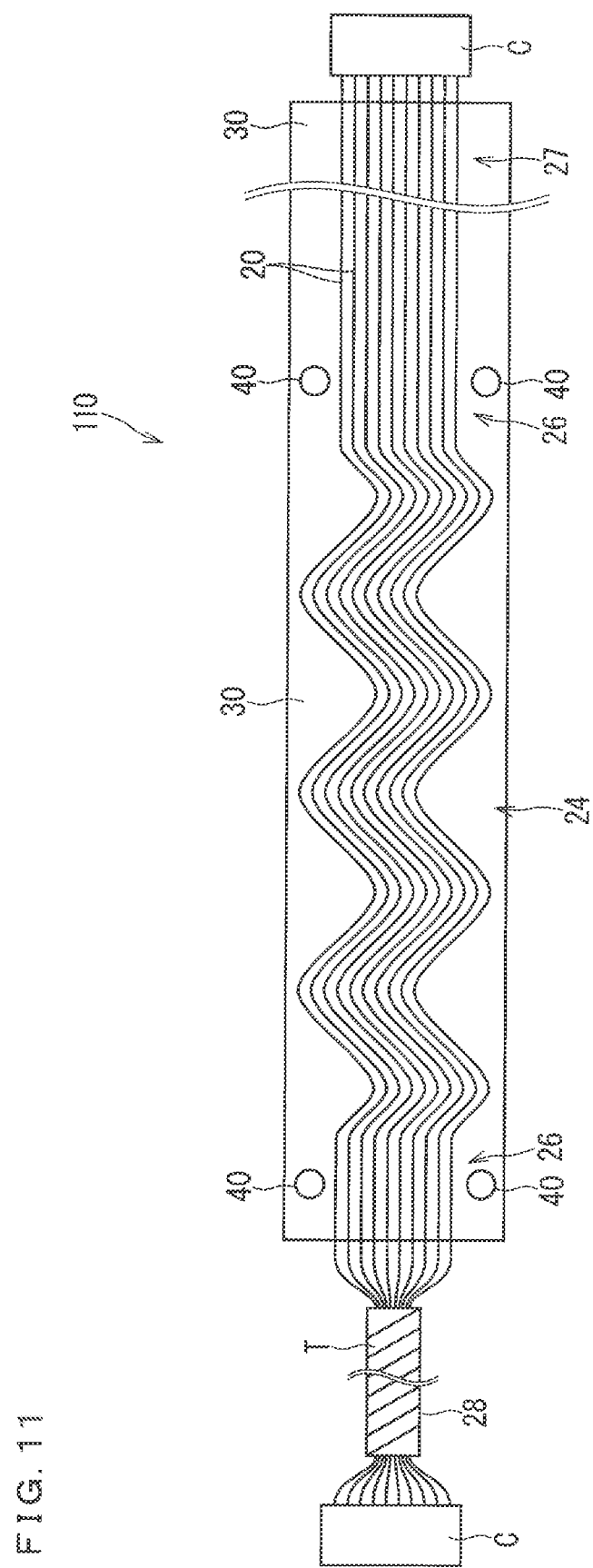
FIG. 11 is a plan view illustrating a first modification example of the wiring member.

FIG. 11 is a plan view illustrating a first modification example of the wiring member 10.

A wiring member 110 according to the first modification example is different from the wiring member 10 described above in that the base material 30 and the straight section 26 of the wire-like transmission member 20 extend to a range close to the connector. In the wiring member 110, the straight section on the side closer to the end portion in relation to the attachment member 40 is referred to a straight section 27. Provided to the wire-like transmission member 20 is the straight section 27 keeping having a straight shape on the side closer to the end portion in relation to the attachment member 40. The straight section 27 is longer than the straight section 26 from the end portion of the zigzag section 24 to the position of the attachment member 40. The plurality of wire-like transmission members 20 keep a flat form also in the straight section 27. Accordingly, the plurality of wire-like transmission members 20 can extend toward the end portion in the flat form. Accordingly, reduction in height of the wiring member 110 can be achieved.

Figure 12:
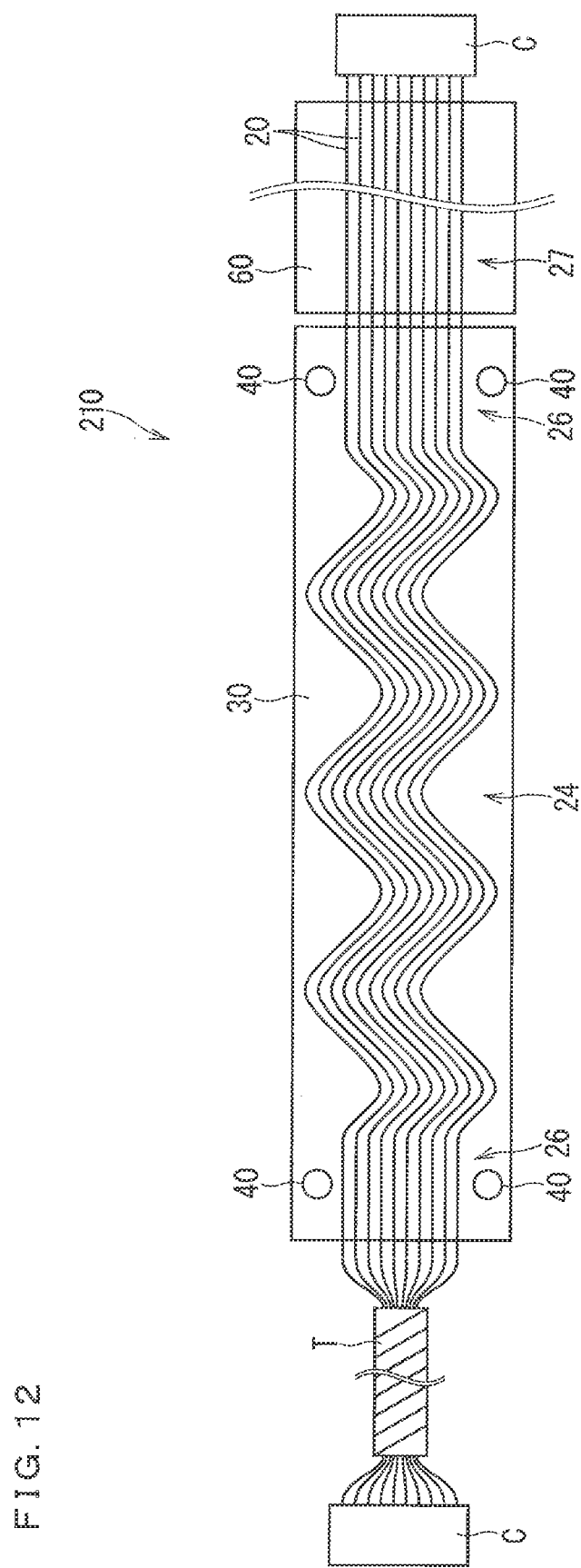
FIG. 12 is a plan view illustrating a second modification example of the wiring member.

FIG. 12 is a plan view illustrating a second modification example of the wiring member 10.

In a wiring member 210 according to the second modification example, the straight section 27 provided on the side closer to the end portion in relation to the attachment member 40 is held on a sheet material 60 different from the base material 30. Accordingly, the plurality of wire-like transmission members 20 are parallelly held in the straight form by the sheet material 60 on the side closer to the end portion in relation to the attachment member 40. For example, this sheet material 60 may extend in the first direction D1 more hardly than the base material 30. For example, it is also applicable that both the base material 30 and the sheet material 60 are the woven fabric, the direction intersecting with the warp thread and the weft thread is the first direction D1 in the woven fabric of the base material 30, and the direction of the warp thread or the weft thread is the first direction D1 in the woven fabric of the sheet material 60. The sheet material 60 may be a foam sheet or a solid sheet made up of a non-elastic material.

In the example illustrated in FIG. 12, the base material 30 and the sheet material 60 are provided at some interval in the first direction D1. The base material 30 and the sheet material 60 may be provided with no interval in the first direction D1. The end portion of the base material 30 and the end portion of the sheet material 60 may be overlapped with each other. A portion where the end portion of the base material 30 and the end portion of the sheet material 60 are overlapped with each other may be fixed to each other.

In the examples in FIG. 11 and FIG. 12, the straight section 27 is provided only on one side of the zigzag section 24 along the extension direction of the wire-like transmission member 20. Accordingly, in the examples in FIG. 11 and FIG. 12, both the circular bundle section 28 and the straight section 27 are provided. The straight section 27 may be provided on both sides of the zigzag section 24 along the extension direction of the wire-like transmission member 20.

Figure 13:
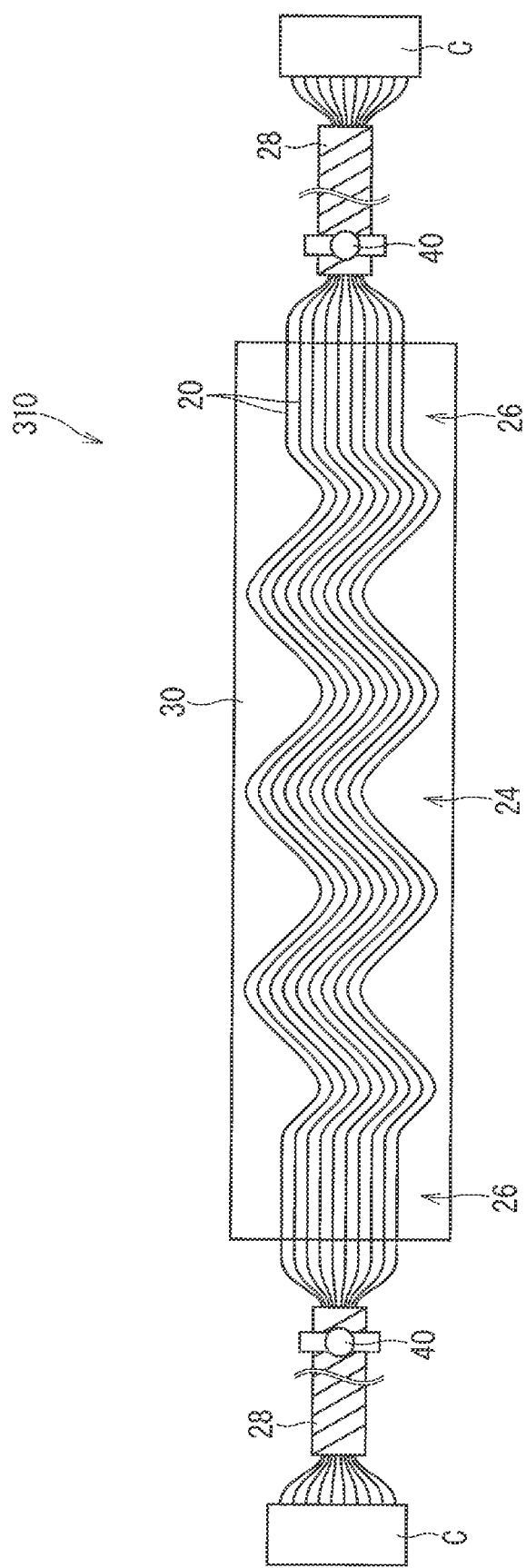
FIG. 13 is a plan view illustrating a third modification example of the wiring member.

FIG. 13 is a plan view illustrating a third modification example of the wiring member 10.

The attachment member 40 is not provided to the base material 30 in a wiring member 310 according to the third modification example. The attachment member 40 is provided to the circular bundle section 28 in the wiring member 310. In this case, external force is applied to the wire-like transmission member 20. When the sheet material 60 is provided on a side closer to the end portion in relation to the base material 30 as with the example illustrated in FIG. 12, the attachment member 40 may be provided to the sheet material 60.

Moreover, in the above description, the base material 30 is the cloth or the elastic sheet, however, this configuration is not necessary. The base material 30 may be a member other than the cloth or the elastic sheet.

In the above description, the plurality of wire-like transmission members 20 are disposed in the flat form on the arrangement surface 32 in the zigzag section 24, however, this configuration is not necessary. The plurality of wire-like transmission members 20 may be disposed on the arrangement surface 32 in a bundled state.

In the above description, the wire-like transmission member 20 extending in the direction D1 is bended in the direction D2 to provide the zigzag section 24, however, this configuration is not necessary. The wire-like transmission member 20 extending in the direction D1 may be bended in the direction D3 to provide the zigzag section 24.

In the above description, the wire-like transmission member 20 is movably held on the base material 30 in the zigzag section 24, however, this configuration is not necessary. The wire-like transmission member 20 is held on the base material 30 in a non-movable state in the zigzag section 24. That is to say, the wire-like transmission member 20 may have a configuration of being moved together with the base material 30 in any position in the zigzag section 24. For example, the wire-like transmission member 20 is wholly and continuously bonded to the base material 30 along the extension direction in the zigzag section 24, thus the wire-like transmission member 20 can be held on the base material 30 in a non-movable state in the zigzag section 24.

In the above description, all of the plurality of wire-like transmission members 20 extend along the same route, however, this configuration is not necessary. A branch part may be provided to the plurality of wire-like transmission members 20. The branch part may also be provided to a section on a side closer to the end portion away from the zigzag section 24. The branch part may also be provided to the zigzag section 24. The branch part may be held on the base material 30 or the sheet material 60.

The configurations described in the embodiments and modification examples thereof can be appropriately combined as long as they are not contradictory.

EXPLANATION OF REFERENCE SIGNS 10, 110, 210, 310 wiring member
20 wire-like transmission member
21 transmission wire body
22 covering layer
24 zigzag section
26, 27 straight section
28 circular bundle section
30 base material
32 arrangement surface
34 crimp
40 attachment member
42 first attachment part
44 second attachment part
50 rigid body
60 sheet material
80 seat (attaching target)
82 movable part
83 first portion (seat body)
84 second portion (backrest)
85 rotation axis
C connector
D1 first direction
D2 second direction
D3 third direction
S shift section
S1 first shift section
S2 second shift section
P parallel section
SF spot fixing part
T tape

The invention claimed is:

1. A wiring member, comprising:
a wire-like transmission member having a zigzag section extending in a zigzag form; and
a base material that has an arrangement surface, wherein the base material is flexible;
attachment members for attaching the wiring member to an attaching target;
a first connector to which one end portion of the wire-like transmission member is connected; and
a second connector to which another end portion of the wire-like transmission member is connected, wherein
the zigzag section is disposed on the arrangement surface;
the base material keeps the zigzag section in the zigzag form;
the attachment members are provided to a first position and a second position away from each other along an extension direction of the wire-like transmission member,
one of the attachment members in the first position and one of the attachment members in the second position are located between the first connector and the second connector,
the zigzag section is provided to at least a section between the first position and the second position, and
wherein the wire-like transmission member is movably held on the base material in the zigzag section.

2. The wiring member according to claim 1, wherein the base material is a cloth or an elastic sheet.

3. The wiring member according to claim 1, wherein the wire-like transmission member is provided as a plurality of wire-like transmission members, and
the plurality of wire-like transmission members are bundled into a circular shape on a side closer to an end portion than the attachment members.

4. The wiring member according to claim 3, wherein the plurality of wire-like transmission members are bundled into the circular shape on a side closer to the end portion than an outer edge of the base material.

5. The wiring member according to claim 1, wherein a straight section kept in a straight shape is provided on the side closer to the end portion in relation to each of the attachment members,
the wire-like transmission member is provided as a plurality of wire-like transmission members, and
the plurality of wire-like transmission members are kept in a flat form in the straight section.

6. The wiring member according to claim 1, wherein the wire-like transmission member is provided as a plurality of wire-like transmission members, and
the plurality of wire-like transmission members are disposed in a flat form on the arrangement surface in the zigzag section.

7. The wiring member according to claim 1, wherein a spot fixing part fixing a part of the wire-like transmission member along an extension direction to the base material is provided in a plurality of positions at intervals along the extension direction of the wire-like transmission member.

8. The wiring member according to claim 1, wherein the wire-like transmission member is provided as a plurality of wire-like transmission members, and the plurality of wire-like transmission members are disposed in a flat form on the arrangement surface and movably held on the base material in the zigzag section.

9. A device with a movable part, comprising:
the wiring member according to claim 1; and
an attaching target including a movable part, wherein
the movable part includes a first portion and a second portion rotatably connected to the first portion,
the wiring member is attached to each of the first portion and the second portion, and
the zigzag section is located between an attachment position where the wiring member is attached to the first portion and an attachment position where the wiring member is attached to the second portion.

10. The device with the movable part according to claim 9, wherein
the attaching target is a seat of a vehicle,
the first portion of the movable part is a seat body including a seat surface of the seat, and the second portion of the movable part is a backrest of the seat, and
the zigzag section expands and contracts in accordance with rotation of the backrest with respect to the seat body.

* * * * *